United States Patent Office 3,644,335
Patented Feb. 22, 1972

---

3,644,335
PREPARATION OF AMIDINES FROM AMIDES
James Valentine Earley, Cedar Grove, Rodney Ian Fryer, North Caldwell, and Leo Henryk Sternbach, Upper Montclair, N.J., assignors to Hoffmann-La Roche Inc., Nutley, N.J.
No Drawing. Continuation-in-part of application Ser. No. 621,434, Mar. 8, 1967. This application May 7, 1968, Ser. No. 727,339
Int. Cl. C07d *53/06*
U.S. Cl. 260—239 BD         8 Claims

ABSTRACT OF THE DISCLOSURE

Amides are converted to their corresponding amidines by reacting the amides with an amino compound in the presence of a non-aqueous acid reagent, e.g., p-toluenesulfonic acid or titanium tetrachloride. This procedure is applicable to primary and secondary amines. In a specific embodiment 1,4-benzodiazepin-2-ones are directly converted into 2-amino-1,4-benzodiazepines.

RELATED APPLICATIONS

This case is a continuation-in-part of Ser. No. 621,434, filed Mar. 8, 1967, inventors Leo Henryk Sternbach, James Valentine Earley and Rodney Ian Fryer, entitled Novel Method for Producing 2-Amino-1,4-Benzodiazepines and now abandoned.

BACKGROUND OF THE INVENTION

In its broadest aspect, the present invention relates to a novel method for converting organic compounds having an amide functional group into a corresponding amidine compound by treating said amide with an amino compound in the presence of a non-aqueous acid reagent selected from the group consisting of p-toluenesulfonic acid and titanium tetrachloride.

In a more specific embodiment of the present invention amides of the general formula:

where R independently is hydrogen, alkyl, aralkyl, alkylener, aryl, substituted aryl, alkyne and cycloalkyl, R' independently is hydrogen, alkyl, aralkyl, alkylene, alkyne and cyclo-alkyl; R and R' taken together in combination with the amide carbon and nitrogen atoms form a ring containing from 4 to 8 atoms, which ring can contain additional hetero-atoms and can bear additional substituents thereon; $R_1$ and $R_2$ independently are hydrogen and lower alkyl; and $R_1$ and $R_2$ together with their attached nitrogen atoms form a 5 or 6 membered heterocyclic ring can be prepared from the corresponding primary and secondary amides of the general formula:

where R and R' are as above by reacting the aforesaid amides of Formula II with an amine of the general formula:

where $R_1$ and $R_2$ are as above, i.e., ammonia or an organic amine in the presence of a non-aqueous acid reagent, e.g., p-toluenesulfonic acid or titanium tetrachloride.

SUMMARY OF THE INVENTION

It has been found that amidines of the Formula I above may be conveniently prepared in a single step reaction by reacting primary and secondary amides of the Formula II above with an amine of the Formula III above in the presence of a non-aqueous acid catalyst selected from the group consisting of p-toluenesulfonic acid and titanium tetrachloride.

In one aspect of the present invention, amidines corresponding to Formula I above wherein R and R' in combination with the amide carbon and nitrogen atoms form a ring containing from 4 to 8 atoms, which ring can contain additional hetero-atoms and can bear additional substituents thereon are prepared by the present process. As a matter of convenience, this class of compounds and preferred embodiments thereof may be readily represented by the following formula:

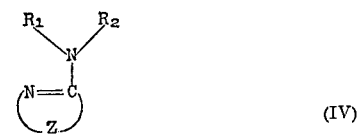

wherein Z is selected from the group consisting of

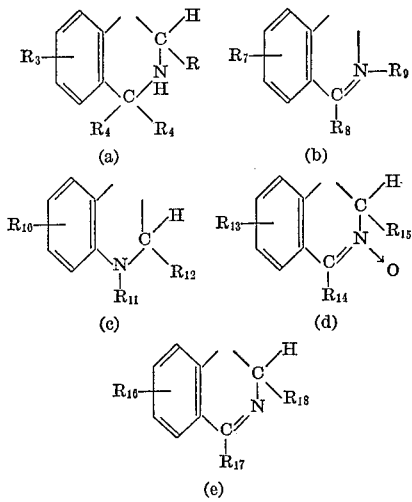

$R_1$ and $R_2$ are as above; $R_3$, $R_7$, $R_{10}$, $R_{13}$, and $R_{16}$ are hydrogen, halogen, nitro, lower alkyl and trifluoromethyl; $R_4$ and $R_5$ taken independently of each other are hydrogen and one other substituent selected from the group consisting of phenyl, lower alkyl substituted phenyl, nitro substituted phenyl, halo substituted phenyl and pyridiyl, and $R_4$ and $R_5$ taken together are a doubly bonded oxygen; $R_6$, $R_9$, $R_{12}$, $R_{15}$ and $R_{18}$ are hydrogen, lower alkyl and lower alkoxy-lower alkyl; $R_8$, $R_{14}$ and $R_{17}$ are phenyl, lower alkyl substituted phenyl, nitro substituted phenyl, halo substituted phenyl and pyridyl; and $R_{11}$ is hydrogen, lower alkyl, alkanoyl, benzoyl and substituted benzoyl.

Compounds of the Formula IV are prepared in analogous manner to that of compounds of the Formula I above, i.e., by reacting a compound of the Formula V below with an amine of the Formula III in the presence of one of the enumerated non-aqueous acid agents.

wherein Z is as above.

The compounds of the Formulas IV and V above are well known as being useful as sedatives, muscle relaxants and anti-convulsants. However, up until the present, the compounds of Formula IV above have been prepared by separate synthetic routes utilizing different reactants. Therefore, it has long been desired to provide a synthesis whereby compounds of Formula V can be converted into the compounds of Formula IV above, thereby eliminating the necessity of utilizing separate synthetic routes for the production of these compounds.

DETAILED DESCRIPTION OF THE INVENTION

As used throughout the specification, the term, alkyl includes both straight and branched chain alkyl groups having from 1–20 carbon atoms, such as methyl, octyl, dodecyl, pentadecyl and the like. In like manner, the term, lower alkyl, includes both straight and branched chain alkyl groups having from 1–7 carbon atoms, such as methyl, ethyl, propyl, isopropyl, and the like. The term lower alkoxy, includes all alkoxy radicals having from 1 to 7 carbon atoms such as methoxy, ethoxy, propoxy, isopropoxy, isobutoxy, etc. The term, aralkyl, includes, for example, phenyl lower alkyl groups, e.g., ring substituted or unsubstituted benzyl compounds. The expression, alkylene includes alkyl groups as defined above containing at least one double bond therein such as ethylenyl, butylenyl and the like. Similarly, the expression alkyne encompasses an alkyl group as defined above having at least one triple bond functionality such as, for example, propynyl. The expression, cycloalkyl encompasses saturated cyclic compounds having from 3 to 8 carbon atoms, preferably, 4–6 carbon atoms, such as for example, cyclobutyl, cyclopentyl and cycloheptyl. The term, halogen, includes all four halogens, i.e., iodine, bromine, chlorine and fluorine, with chlorine, fluorine, and bromine being preferred.

One preferred aspect of the compounds of Formula I above is obtained when R is hydrogen, R' is alkyl, and $R_1$ and $R_2$ are selected from hydrogen and lower alkyl. This preferred embodiment covers examples of primary amidines and encompasses the amidines of the fatty acids, preferably the lower fatty acids. As indicated previously, they are prepared from compounds of Formula II above which in this embodiment would comprise a primary amide of a lower fatty acid such as for example, a fatty acid having from 1 to 7 carbon atoms, most preferably, from 1 to 5 carbon atoms, i.e., formamide or butyramide. In a most preferred embodiment $R_1$ and $R_2$ of the compound of Formula I consist of one hydrogen and one lower alkyl group, most preferably methyl, which is obtained by reacting the lower fatty acid amide with a suitable amine of Formula III above, e.g., methylamine.

One preferred aspect of the compounds of Formula IV involves the subformulae corresponding to the 1,4-benzodiazepine series, i.e., subformulae (a), (d), and (e). In this preferred series $R_3$, $R_{13}$ and $R_{16}$ are preferably halogen, e.g., chloro, and nitro, said substituents being located at the 7-position on the phenyl ring. Additionally, $R_4$ and $R_5$ when taken independently consist of one hydrogen atom and a phenyl group. $R_{14}$ and $R_{17}$ are preferably phenyl. Finally, $R_5$, $R_{15}$ and $R_{16}$ in a preferred embodiment are hydrogen.

A preferred aspect of subformula (b) comprises the quinolone series of compounds. In such series $R_7$ is preferably a nitro group located at the 6-position on the phenyl ring. $R_8$ preferably is a phenyl ring and $R_9$ is a hydrogen atom in this preferred species. Additionally, one member of the $R_1$ and $R_2$ groups is hydrogen and the other member lower alkyl, most preferably methyl.

With reference to the embodiments relating to subformula (c) the preferred embodiments of the quinoxaline series comprise compounds wherein one member of the $R_1$ and $R_2$ groups is hydrogen and the other is lower alkyl. Especially preferred examples of lower alkyl groups in this series include methyl and n-butyl. Similarly, $R_{10}$ in a preferred aspect is hydrogen or halogen. When $R_{10}$ is halogen, it is most preferably substituted at the 6-position on the phenyl ring and most preferably represents a chloro group. $R_{11}$ is preferably benzoyl or a substituted benzoyl. Preferred examples of substituted benzoyl include chloro, nitro, and methylbenzoyl substituted in the ortho and para positions. Finally, $R_{12}$ in a preferred embodiment is hydrogen.

The preferred organic amines utilized in the process of the present invention are primary amines, i.e., where $R_1$ and $R_2$ taken independently are hydrogen and lower alkyl, such as methylamine, ethylamine, isopropylamine, propylamine, butylamine, etc. While it is generally preferred to utilize primary amines in carrying out the reactions of this invention, secondary amines, i.e., where $R_1$ and $R_2$ taken independently are lower alkyl can be employed as well as the aforementioned primary amines. Any conventional lower alkyl secondary amine can be utilized in accordance with this invention. Among the conventional secondary amines which can be used in this invention are included dialkyl amines such as diethylamine, dimethylamine and N,N-propyl-butylamine among others. Other secondary amines include cyclic amines where $R_1$ and $R_2$ taken with their attached nitrogen atom form 5 or 6 membered heterocyclic rings such as pyrrolidine, piperidine, etc.

As indicated previously, the non-aqueous acid agents utilized in accordance with this invention are p-toluenesulfonic acid and titanium tetrachloride. The reaction of the present invention may be carried out in the presence of an inert organic solvent. Any conventional organic solvent can be employed in carrying out this reaction. Typical organic solvents which can be utilized in accordance with this invention include diethyl ether, tetrahydrofuran, benzene, hexane, pentane, ethylpropyl ether and mixtures thereof. In carrying out this reaction, temperature and pressure are not critical and this reaction can be effected at room temperature or below, and at atmospheric pressure or at elevated temperatures and/or elevated pressure. Generally, it is preferred to carry out this reaction at a temperature of from about 0° to about 25° C. While it is generally preferable to utilize these low temperatures, temperatures as high as the reflux temperature of the solvent can be utilized.

The invention is further illustrated by the following examples. In the examples, all temperatures are given in degrees centigrade.

EXAMPLE 1

Preparation of 7-chloro-5-phenyl-2-pyrrolidino-3H-1,4-benzodiazepine

A solution of 7-chloro-1,3-dihydro-5-phenyl-2H-1,4-benzodiazepin-2-one (5 gm.), pyrrolidine (30 ml.) and p-toluenesulfonic acid monohydrate (0.1 gm.) in toluene (100 ml.) was stirred and refluxed under a Dean-Stark head containg "Drierite" to remove the water formed. After 22.5 hr., the distillate was discarded and the residual solution in the reaction flask was evaporated in vacuo. The residue was extracted with a mixture of ether and 3 N-acetic acid; the acid layer was filtered, and the filtrate made basic with dilute sodium hydroxide solution, to give crude 7-chloro-5-phenyl-2-pyrrolidino-3H-1,4-benzodiazepine. This crude product was crystallized from isopropanol to yield pure 7-chloro-5-phenyl-2-pyrroldino-3H-1,4-benzodiazepine melting at 139–141°.

EXAMPLE 2

Preparation of 7-chloro-2-methylamino-5-phenyl-3H-1,4-benzodiazepine

A solution of 5 g. (0.0184 m.) of 7-chloro-1,3-dihydro-5-phenyl-2H-1,4-benzodiazepin-2-one in 125 ml. of dry tetrahydrofuran was added to a solution of 15 g. of methylamine in 100 ml. of dry tetrahydrofuran. The mixture was contained in a three neck round bottom flask fitted with a stirrer, dropping funnel and "Dry Ice" condenser. The flask was externally cooled in an ice bath and the mixture was kept under nitrogen. A tetrahydrofuran, titanium tetrachloride complex prepared by adding 1.8 g. (0.01 M) of titanium tetrachloride to 60 ml. of tetrahydrofuran was added slowly (20 min.) to the reaction mixture. The resulting mixture was continually stirred and allowed to reach room temperature. After 4 hr., thin layer chromatography indicated that the reaction was complete. The reaction mixture was allowed to stand overnight and then filtered. The filtrates were evaporated to dryness, and the residue was dissolved in 500 ml. of dichloromethane. The organic solution was washed with dilute ammonium hydroxide (1× 200 ml.), saturated brine solution (2× 100 ml.), dried over anhydrous sodium sulfate, filtered and evaporated. The residue was crystallized from a mixture of tetrahydrofuran and hexane to give 7-chloro-2-methylamino-5-phenyl-3H-1,4-benzodiazepine melting at 243–248°.

EXAMPLE 3

Preparation of 2-methylamino-7-nitro-5-phenyl-3H-1,4-benzodiazepine

A solution of 5 g. (0.0178 M) of 1,3-dihydro-7-nitro-5-phenyl-2H-1,4-benzodiazepin-2-one in 150 ml. of dry tetrahydrofuran was added to a solution of 10 g. of methylamine in 100 ml. of dry tetrahydrofuran. The resulting solution was cooled as described in Example 2 and treated with a solution of 2.4 g. (0.013 M) of titanium tetrachloride in 50 ml. of dry benzene. The mixture was warmed to room temperature and stirred overnight. Approximately 10 ml. of water was added to decompose excess titanium tetrachloride and the solution was filtered. After the solvent was removed, the residue was treated with 50 ml. of ethanol. The residue was filtered to remove solids. After filtration, the remaining liquor was concentrated to yield 2-methylamino-7-nitro-5-phenyl-3H-1,4-benzodiazepine which after crystallization from methanol had a melting point of 225–228°.

EXAMPLE 4

Preparation of 7-chloro-2-methylamino-5-phenyl-3H-1,4-benzodiazepin-4-oxide

A solution of 10 g. (0.0384 M) of 7-chloro-1,3-dihydro-5-phenyl-2H-1,4-benzodiazepin-2-one 4-oxide in 400 ml. of dry tetrahydrofuran was added to a solution of 20 g. of methylamine in 200 ml. of dry tetrahydrofuran. The resulting mixture was cooled as described in Example 2 and then treated with a tetrahydrofuran, titanium tetrachloride complex prepared from 4.8 g. (0.025 M) of titanium tetrachloride and 100 ml. of dry tetrahydrofuran (addition time 20 min.). The resulting mixture was allowed to warm to room temperature, sand overnight, and was then filtered. The filtrates were evaporated to dryness and the product recrystallized from methanol to give 7-chloro-2-methylamino-5-phenyl-3H-1,4-benzodiazepin-4-oxide as pale yellow prisms melting at 238–242°.

EXAMPLE 5

Preparation of 7-chloro-2-dimethylamino-5-phenyl-3H-1,4-benzodiazepine 4-oxide

A solution of 10 g. (0.0348 M) of 7-chloro-1,3-dihydro-5-phenyl-2H-1,4-benzodiazepin-2-one 4-oxide in 400 ml. of dry tetrahydrofuran was added to a solution of 20 g. of dimethylamine in 200 ml. of dry tetrahydrofuran. The solution was cooled as described in Example 2 and then treated with a solution of 4.8 g. (0.025 M) of titanium tetrachloride in 100 ml. of dry benzene (addition time 20 min.). The reaction mixture was allowed to reach room temperature, stirred for three hours, when 10 ml. of water was added. The solution was filtered and the solvent was removed under reduced pressure. The residue was stirred in 50 ml. of ethanol and then shaken vigorously with 100 ml. of 0.5 N sodium hydroxide solution to remove starting material. The mixture was diluted with 400 ml. of water and then filtered. The precipitate was washed with water and recrystallized from ethanol to give 7-chloro-2-dimethylamino-5-phenyl-3H - 1,4 - benzodiazepine 4-oxide melting at 205–209°.

EXAMPLE 6

Preparation of 7-chloro-2-isopropylamine-5-phenyl-3H-1,4-benzodiazepine 4-oxide

A solution of 10 g. (0.0348 M) of 7-chloro-2-isopropylamine-5-phenyl-2H-1,4-benzodiazepin-2-one 4-oxide in 400 ml. of dry tetrahydrofuran was treated at 0–10° first with 15 ml. of isopropylamine and then with a solution of 4.8 g. (0.025 M) of titanium tetrachloride in 100 ml. of dry benzene (addition time 20 minutes). The reaction mixture was allowed to warm to room temperature and was stirred overnight. Water (10 ml.) was added and the solution was filtered then evaporated. The residue was stirred in 50 ml. of ethanol and shaken well with 100 ml. of 0.5 N sodium hydroxide solution to remove starting material. The mixture was diluted with 400 ml. of water and filtered. The insoluble product was washed on the filter with water and was then recrystallized from ethanol to give 7-chloro-2-isopropylamine-5-phenyl-3H-1,4-benzodiazepine 4-oxide, melting at 248–250° C.

EXAMPLE 7

Preparation of 7-chloro-5-phenyl-2-piperidino-3H-1,4-benzodiazepine-4-oxide

A mixture of 10 g. (0.0348 M) of 7-chloro-1,3-dihydro-5-phenyl-2H-1,4-benzodiazepin-2-one 4-oxide and 15 ml. of piperidine in 400 ml. of dry tetrahydrofuran was cooled as in Example 2 and then treated with a solution of 4.8 g. (0.025 M) of titanium tetrachloride in 100 ml. of dry benzene (addition time 20 minutes). The mixture was allowed to warm to room temperature and stirred overnight. Water (10 ml.) was added and the reaction mixture was filtered. Solvents were removed, the residue was stirred in 50 ml. of ethanol and then shaken thoroughly with 100 ml. of 0.5 N sodium hydroxide solution. The mixture was filtered and the precipitate was washed with water. Recrystallization from a mixture of dichloromethane and hexane gave 7-chloro-5-phenyl-2-piperidino - 3H - 1,4-benzodiazepine 4- oxide as pale yellow prisms, melting at 164–170°.

EXAMPLE 8

Preparation of 2-amino-7-chloro-5-phenyl-3H-1,4-benzodiazepine 4-oxide

A solution of 10 g. (0.03348 M) of 7-chloro-1,3-dihydro-5-phenyl-2H-1,4-benzodiazepin-2-one 4-oxide in 400 ml. of dry tetrahydrofuran was stirred in a three-neck round-bottom flask fitted with a "Dry Ice" condenser and dropping funnel. The flask was cooled externally with an ice bath. Ammonia gas was bubbled into the solution until liquid ammonia was rapidly condensing on the "Dry Ice" finger. A solution of 4.8 g. (0.025 M) of titanium tetrachloride in 100 ml. of benzene was next added dropwise (addition time 20 minutes). The cooling bath was removed and the reaction mixture was allowed to reach room temperature. After stirring overnight, 10 ml. of water was added and the solution was filtered. Removal of solvents gave a residue which was slurried with 50 ml. of ethanol and then shaken vigorously with 100 ml. of 0.5 N sodium hydroxide solution. The resulting mixture was diluted with 400 ml. of water and the precipitate was removed by filtration and washed with water. Recrystallization from methanol gave 2-amino-7-chloro-5-phenyl-3H-1,4-benzodiazepine 4-oxide, melting at 278–283°.

EXAMPLE 9

Preparation of 7-chloro-4,5-dihydro-2-methylamino-5-phenyl-3H-1,4-benzodiazepine To a suspension of 25 g. (0.0916 M) of 7-chloro-1,3,4,5-tetrahydro-5-phenyl-2H-1,4-benzodiazepin-2-one dissolved in 300 ml. of dry tetrahydrofuran (under a nitrogen atmosphere) was added a solution of 30 g. of methylamine in 300 ml. of dry tetrahydrofuran. The above mixture was cooled in an ice bath, and a solution of 12 g. (0.0632 M) of titanium tetrachlrodie in 100 ml. of benzene was added over a 10 minute period with stirring. The ice bath was removed, and after four hours, 20 ml. of water was added. The solution was filtered, the precipitate was washed with tetrahydrofuran and the combined filtrates were evaporated to dryness. The oil was crystallized from a methanol/ether mixture to yield solid 7-chloro-4,5-dihydro-2-methylamino-5-phenyl - 3H - 1,4 - benzodiazepine as white plates, melting at 175–180°.

EXAMPLE 10

Preparation of 7-chloro-3,4-dihydro-2-methylamino-5H-1,4-benzodiazepin-5-one

A suspension of 8.4 g. (40 mmole) of 7-chloro-1,3-dihydro-2H-1,4-benzodiazepin-2,5-(4H)-dione in 1.5 l. of tetrahydrofuran was cooled to 10° and methylamine was bubbled in for ¼ hour. During 15 minutes, a solution of 6 ml. (46 mmole) of titanium tetrachloride in 100 ml. of benzene was added to the stirred suspension held at 10°. The reaction mixture was then heated under reflux for 2 hours. After it had been cooled, 60 ml. of ice water was added, and the precipitate filtered off. The filtrate was dried over sodium sulfate and concentrated in vacuo. The residue was first crystallized from tetrahydrofuran and petroleum ether and then from methanol to give the product as colorless prisms, melting at 246–249° (dec).

EXAMPLE 11

Preparation of 7-chloro-2-methylamino-5-phenyl-3H-1,4-benzodiazepine

A mixture of 4.5 g. (20 mmole) of 7-chloro-3,4-dihydro-2-methylamino - 5H-1,4-benzodiazepin - 5-one and 100 ml. of phosphorous oxychloride was heated under reflux overnight and concentrated in vacuo. Twice toluene was added to the residue and distilled out in vacuo. The residue was dissolved in 200 ml. of dry tetrahydrofuran and added during 15 minutes to a solution of phenyl magnesium bromide in 500 ml. of tetrahydrofuran prepared from 3.9 g. (0.16 mole) of magnesium and 17.7 ml. (0.17 mole) of bromobenzene. The reaction mixture was then stirred and heated under reflux for 4 hours, it was then cooled, diluted with methylene chloride and saturated sodium bicarbonate solution. Glacial acetic acid was added until the precipitate dissolved. The organic layer was separated, dried over sodium sulfate and concentrated in vacuo. The residue was crystallized from acetone to give crude product, melting at 235–240°. Recrystallization from acetone gave the pure product as yellowish prisms, melting at 242–244°.

EXAMPLE 12

Preparation of 4-benzoyl-6-chloro-3,4-dihydro-2-methylaminoquinoxaline

To a solution of 5.4 g. (20 mmole) of 4-benzoyl-6-chloro-3,4-dihydroquinoxalin-2(1H)-one in 500 ml. of tetrahydrofuran saturated at 10° with methylamine was added 3 ml. (23 mmole) of titanium tetrachloride dissolved in 100 ml. of benzene. This mixture was stirred and heated under reflux for 2 hours. To the cooled solution was added 30 ml. of water. The precipitate was removed by filtration, and the filtrate dried (sodium sulfate) and concentrated in vacuo to give colorless needles, melting at 220–235° (dec.).

EXAMPLE 13

Preparation of 1-benzoyl-1,2-dihydro-3-methylaminoquinoxaline

To a solution of 25.6 g. (0.109 mole) of 4-benzoyl-3,4-dihydro-quinoxalin-2-(1H)-one in 1.5 l. of dry tetrahydrofuran at 10° into which methylamine had been bubbled for 0.5 hour was added a solution of 20 ml. of titanium tetrachloride in 500 ml. of benzene during 0.5 hour. This mixture was then stirred and heated under reflux for 4 hours. To the cooled solution was added 170 ml. of water. The precipitate was removed by filtration; the filtration was dried over sodium sulfate and concentrated in vacuo. The residue was crystallized from ether to give product melting at 215–220°. Recrystallization from ethanol gave colorless prisms, melting at 209–219° (dec.).

EXAMPLE 14

Preparation of 3-(n-butylamino)-1-(2-chlorobenzoyl)-1,2-dihydroquinoxaline

To a solution of 34.7 g. of 4-(2-chlorobenzoyl)-3,4-dihydro-2-(1H)-quinoxalinone and 50 ml. of n-butylamine in 2.5 l. of dry tetrahydrofuran cooled to 10° was added a solution of 17.5 ml. of titanium tetrachloride in 500 ml. of benzene. This mixture was then stirred and heated under reflux for 2 hours. To the cooled solution was added 200 ml. of water. The solution was then dried over sodium sulfate and concentrated in vacuo. The residue was partitioned between water and 2 l. of methylene chloride. The organic layer was separated, washed with water, dried over sodium sulfate and concentrated in vacuo. The residue was crystallized first from ether and then ethanol/ether to give the product as colorless needles, melting at 225–229°.

EXAMPLE 15

Preparation of 1,2-dihydro-3-methylamino-1-(4-methylbenzoyl)quinoxaline

To a solution of 32.2 g. of 3,4-dihydro-4-(4-methylbenzoyl)-2-(1H)-quinoxalinone in 2.5 l. of dry tetrahydrofuran at 10° into which methylamine had been bubbled for 0.5 hour was added a solution of 17.5 ml. of titanium tetrachloride in 500 ml. of benzene during 0.5 hour. This mixture was then stirred and heated under reflux for 2 hours. To the cooled solution was added 150 ml. of water. The precipitate was removed by filtration; the filtrate was dried over sodium sulfate and concentrated in vacuo. The residue was crystallized first from ether/petroleum ether and then from tetrahydrofuran/petroleum ether to give the product as colorless needles, melting at 186–190°.

EXAMPLE 16

Preparation of 1-(2-chlorobenzoyl)-1,2-dihydro-3-methylaminoquinoxaline

To a solution of 34.7 g. of 4-(2-chlorobenzoyl)-3,4-dihydro-2-(1H)-quinoxalinone in 2.5 l. of dry tetrahydrofuran at 10° into which methylamine had been bubbled for 0.5 hour was added a solution of 17.5 ml. of titanium tetrachloride in 500 ml. of benzene during 0.5 hour. This mixture was then stirred and heated under reflux for 2 hours. To the cooled solution was added 150 ml. of water. The precipitate was removed by filtration; the filtrate was dried over sodium sulfate and concentrated in vacuo. The residue was crystallized first from ether and then from chloroform/hexane to give the product as off-white prisms, melting at 184–187°.

EXAMPLE 17

Preparation of 1,2-dihydro-3-methylamino-1-(4-nitrobenzoyl)quinoxaline

To a solution of 36 g. of 3,4-dihydro-4-(4-nitrobenzoyl)-2-(1H)-quinoxalinone in 2.5 l. of dry tetrahydrofuran at 10° into which methylamine had been bubbled for 0.5 hour was added a solution of 17.5 ml. of titanium tetrachloride in 500 ml. of benzene during 0.5 hour. This mixture was then stirred and heated under reflux for 2 hours. To the cooled solution was added 150 ml. of water. The precipitate was removed by filtration; the filtrate was dried over sodium sulfate and concentrated in vacuo. The residue was crystallized from ether to give product as prisms, melting at 184–187°.

EXAMPLE 18

Preparation of 2-methylamino-4-phenyl-6-nitroquinoline

A solution of 7 g. (0.0263 M) of 6-nitro-4-phenyl-carbostyril in 150 ml. of tetrahydrofuran, cooled in an ice bath was treated with a solution of 15 g. of methylamine in 100 ml. of dry tetrahydrofuran. A solution containing 3 g. (0.0158 M) of titanium tetrachloride in 50 ml. of benzene was added dropwise and the solution, after standing for 18 hours, at room temperature, was heated under reflux for 2 hours, using a dry ice condenser and then for 3 hours, with a water condenser.

Water (10 ml.) was added to the solution, which was then exaporated to dryness. The residue was triturated with 150 ml. of dichloromethane and 100 ml. of dilute ammonium hydroxide. The precipitate was removed by filtration, the layers were separated and the methylene chloride layer was washed with 50 ml. of a saturated brine solution, dried over anhydrous sodium sulfate and evaporated to dryness. The solid residue was recrystallized from a mixture of dichloromethane, ether, and petroleum ether to give 2 - methylamino - 4-phenyl-6-nitroquinoline as yellow rods, melting at 211–215°.

EXAMPLE 19

Preparation of 7-chloro-2-methylamino-5-phenyl-4,5-dihydro-3H-1,4-benzodiazepine A solution of 5 g. (0.0183 M) of 7 - chloro - 1,3,4,5-tetrahydro - 5 - phenyl - 2H - 1,4-benzodiazepin-2-one in 200 ml. of dry tetrahydrofuran cooled in an ice bath was treated with solution of 15 g. of methylamine in 100 ml. of dry tetrahydrofuran. A solution of 3.5 g. (0.0183 M) of titanium tetrachloride in 50 ml. of benzene was slowly added and after one hour, the ice bath was removed and the reaction mixture was stirred for 17 hours at room temperature. Water (10 ml.) was added to the orange solution and the precipitate was removed by filtration. The precipitate was washed with tetrahydrofuran and all filtrates were combined and evaporated to dryness. The solid product was recrystallized from a mixture of ether and petroleum ether to give 7-chloro-2 - methylamino - 5 - phenyl - 4,5 - dihydro-3H-1,4-benzodiazepine as white prisms, melting at 174–177° (sealed tube).

EXAMPLE 20

Preparation of N,N'-dimethylbutyramidine hydrochloride

To a stirred solution of 3.48 g. of n-butyramide in 150 ml. of benzene, contained in a flask equipped with a "Dry-Ice" condenser, was added a solution of 25 g. of methylamine in 100 ml. of benzene. This mixture which was cooled in ice and under an atmosphere of nitrogen, was then treated dropwise with a solution of 4.8 g. of titanium tetrachloride in 50 ml. of benzene. The resultant mixture was stirred in ice for 2 hours and then at room temperature overnight. After the addition of 10 ml. of water, the suspension was filtered and the precipitate was thoroughly washed with methylene chloride. The filtrate was concentrated to dryness and the residue treated with methanolic hydrogen chloride and then ether. After refrigeration, filtration gave white prisms, melting at 110–117°.

EXAMPLE 21

Preparation of formamidine picrate

To an ice-cooled, stirred solution of 4.5 g. of formamide dissolved in 250 ml. of dry tetrahydrofuran contained in a flask equipped with a "Dry-Ice" condenser, was added gaseous ammonia until completely saturated. While under an atmosphere of nitrogen, 12 g. of titanium tetrachloride in 60 ml. of dry benzene was added carefully. After stirring overnight, the suspension was filtered and the precipitate was washed with tetrahydrofuran. The filtrate was concentrated to dryness and the residue treated with an ethanol solution of picric acid. The resultant picrate, yellow prisms, melted at 251–253°.

What is claimed is:

1. A process for the preparation of a compound of the formula

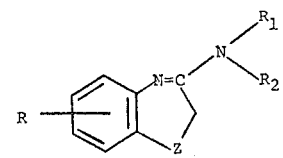

wherein R is hydrogen, halogen, nitro, lower alkyl or trifluoromethyl; $R_1$ and $R_2$ independently are hydrogen or lower alkyl; and $R_1$ and $R_2$ together with their attached nitrogen atom form a 5 or 6 membered heterocyclic ring selected from the group consisting of pyrrolidine and piperidine; and Z is selected from the group consisting of

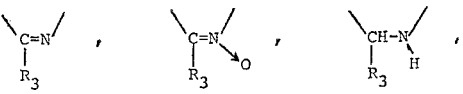

where $R_3$ is phenyl, halo-phenyl or pyridyl which comprises reacting a compound of the formula

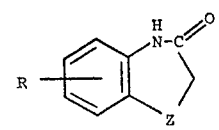

wherein R and Z are as described above with an amine of the formula

wherein $R_1$ and $R_2$ are as described above in the presence of a non-aqueous acid reagent selected from the group consisting of p-toluene sulfonic acid and titanium tetrachloride.

2. The process of claim 1, wherein said catalyst is titanium tetrachloride.

3. The process of claim 1 wherein said catalyst is p-toluene sulfonic acid.

4. The process of claim 1 wherein R is halogen located at the 7-position of the phenyl ring and $R_3$ is phenyl.

5. The process of claim 4, wherein said halogen is chlorine.

6. The process of claim 1, wherein $R_1$ and $R_2$ taken independently of each other are hydrogen and lower alkyl.

7. The process of claim 1, wherein $R_1$ and $R_2$ taken together with the nitrogen atom form a 5 or 6 membered heterocyclic ring.

8. The process of claim 1, wherein $R_1$ and $R_2$ both are lower alkyl.

References Cited

Wagner et al.: Synthetic Organic Chemistry (1953) pp. 635–36.

ALEX MAZEL, Primary Examiner

J. A. NARCAVAGE, Assistant Examiner

U.S. Cl. X.R.

260—239.3 D, 250 A, 288 R, 293 D, 326.81, 564 R, 999